(12) United States Patent
Li et al.

(10) Patent No.: US 12,744,403 B2
(45) Date of Patent: Sep. 22, 2026

(54) ENERGY STORAGE SYSTEM AND BLACK START APPARATUS

(71) Applicant: Huawei Digital Power Technologies Co., Ltd., Shenzhen (CN)

(72) Inventors: Jianshan Li, Shanghai (CN); Tong Yuan, Shanghai (CN); Tao Zhang, Shanghai (CN); Shijiang Yu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/216,576

(22) Filed: May 22, 2025

(65) Prior Publication Data

US 2025/0286403 A1 Sep. 11, 2025

Related U.S. Application Data

(63) Continuation of application No. PCT/CN2023/125157, filed on Oct. 18, 2023.

(30) Foreign Application Priority Data

Nov. 23, 2022 (CN) ........................ 202211476597.8

(51) Int. Cl.
*H02J 9/06* (2006.01)
*H02J 3/32* (2006.01)
(Continued)

(52) U.S. Cl.
CPC ................ *H02J 9/061* (2013.01); *H02J 3/32* (2013.01); *H02J 7/50* (2026.01); *H02J 7/96* (2026.01);
(Continued)

(58) Field of Classification Search
CPC ...................................................... H02J 9/061
(Continued)

(56) References Cited

U.S. PATENT DOCUMENTS

2018/0248378 A1* 8/2018 Ren ......................... H02J 3/381
2019/0317153 A1 10/2019 Pan et al.
(Continued)

FOREIGN PATENT DOCUMENTS

CN 204424918 U 6/2015
CN 206990755 U 2/2018
(Continued)

*Primary Examiner* — Joseph Chang
(74) *Attorney, Agent, or Firm* — Leydig, Voit & Mayer, Ltd.

(57) ABSTRACT

An energy storage system includes a battery cluster and a black start bus. The battery cluster includes a plurality of battery packs that are connected in series. A target battery pack in the plurality of battery packs carries a black start control. The black start control is configured to: when being triggered, electrically connect a target energy storage battery to a target auxiliary power supply. The target auxiliary power supply is configured to supply power to a target controller and the black start bus based on electric energy provided by the target energy storage battery, to trigger the black start bus to supply power to an auxiliary power supply in another battery pack. The auxiliary power supply in the another battery pack is configured to: electrically connect to an energy storage battery based on electric energy provided by the black start bus; and supply power to a controller.

20 Claims, 4 Drawing Sheets

(51) Int. Cl.
*H02J 7/50* (2026.01)
*H02J 7/96* (2026.01)

(52) U.S. Cl.
CPC ....... *H02J 2207/10* (2020.01); *H02J 2207/20* (2020.01)

(58) Field of Classification Search
USPC ............................................................ 307/64
See application file for complete search history.

(56) References Cited

U.S. PATENT DOCUMENTS

| | | | | |
|---|---|---|---|---|
| 2020/0274362 | A1* | 8/2020 | Allert | H02J 3/32 |
| 2020/0381927 | A1 | 12/2020 | Feng et al. | |
| 2022/0200314 | A1 | 6/2022 | Zhou et al. | |
| 2022/0271563 | A1* | 8/2022 | Hug | H02J 9/06 |

FOREIGN PATENT DOCUMENTS

| | | | |
|---|---|---|---|
| CN | 113629757 | A | 11/2021 |
| CN | 115733237 | A | 3/2023 |

* cited by examiner

ENERGY STORAGE SYSTEM AND BLACK START APPARATUS

CROSS-REFERENCE TO RELATED APPLICATIONS

This application is a continuation of International Application No. PCT/CN2023/125157, filed on Oct. 18, 2023, which claims priority to Chinese Patent Application No. 202211476597.8, filed on Nov. 23, 2022. The disclosures of the aforementioned applications are hereby incorporated by reference in their entireties.

TECHNICAL FIELD

This application relates to the power electronics field, and in particular, to an energy storage system and a black start apparatus.

BACKGROUND

Black start means a process in which after an entire system stops running due to a fault, without help of another network, a unit with a self-start capability in the system starts, to drive a unit without the self-start capability, thereby gradually expanding a restoration scope of the entire system and finally restoring the entire system. Black start is widely applied in various energy storage systems. When an energy storage system is disconnected from a power grid due to a fault, the energy storage system is in an off-grid mode. In this case, a battery module in the energy storage system is triggered through black start, to restore a connection between the system in the off-grid mode and a power-consuming device in the power grid. Generally, black start is implemented by supplying power by using an uninterruptible power supply (UPS), or implemented by using power of a battery cluster in the energy storage system. However, for a large-capacity energy storage system (for example, a system including hundreds of battery packs), a black start solution in which the UPS is used to supply power requires a UPS device to provide a high supplying power, resulting in high black start costs. In addition, when a battery pack in the energy storage system is not continuously connected to a bus, a cluster-level battery bus in the energy storage system cannot supply power before the energy system is started, and black start cannot be implemented by using the power of the battery cluster in the energy storage system.

SUMMARY

Embodiments of this application provide an energy storage system and a black start apparatus. In this way, black start can be implemented when a battery pack is equipped with a built-in battery optimizer, and problems such as poor start experience, high costs, and low reliability caused because a black start control needs to be installed in all battery packs in a battery cluster can be avoided. In addition, when black start is performed by using a UPS, a supplying power by using the UPS can be reduced, thereby significantly reducing black start costs.

According to a first aspect, this application provides an energy storage system. The energy storage system includes a battery cluster and a black start bus. The battery cluster is coupled to an alternating current power grid. The battery cluster includes a plurality of battery packs that are connected in series. The battery pack includes an energy storage battery, a controller, and an auxiliary power supply that is connected in parallel to the energy storage battery. The auxiliary power supply is coupled to the black start bus. The plurality of battery packs include a target battery pack associated with a black start control. The black start control is disposed between a target energy storage battery and a target auxiliary power supply in the target battery pack. The black start control is configured to: when being triggered, electrically connect the target energy storage battery to the target auxiliary power supply in the target battery pack. The target auxiliary power supply is configured to supply power to a target controller in the target battery pack and the black start bus based on electric energy provided by the target energy storage battery, to trigger the black start bus to supply power to auxiliary power supplies in battery packs in the plurality of battery packs other than the target battery pack. The auxiliary power supply in each battery pack in the other battery packs is configured to: electrically connect to each energy storage battery in each battery pack based on electric energy provided by the black start bus; and supply power to a controller in each battery pack based on electric energy provided by each energy storage battery.

In this application, by using the black start control carried in the target battery pack, the target battery pack in the plurality of battery packs electrically connects the target energy storage battery to the target auxiliary power supply in the target battery pack. In this way, the target auxiliary power supply supplies power to the target controller in the target battery pack and the black start bus based on the electric energy provided by the target energy storage battery, to trigger the black start bus to supply power to the auxiliary power supplies in the battery packs in the plurality of battery packs other than the target battery pack. The auxiliary power supply in each battery pack in the other battery packs is configured to: electrically connect to each energy storage battery in each battery pack based on electric energy provided by the black start bus; and supply power to a controller in each battery pack based on electric energy provided by each energy storage battery. In the energy storage system, the black start control in the single target battery pack is triggered, so that the target battery pack obtains power from an energy storage battery in the battery pack and supplies power to the black start bus, and the black start bus supplies power to the auxiliary power supplies in the other battery packs (to electrically connect the auxiliary power supply to the energy storage battery in the other battery packs). In this way, problems such as poor start experience, high costs, and low reliability that are caused because the black start control needs to be installed in all battery packs in the battery cluster are avoided. In addition, a UPS power required for performing black start by using the UPS is very low (the UPS needs to supply power only for a process of electrically connecting the auxiliary power supply to the energy storage battery), thereby reducing a UPS capacity when the UPS is equipped and significantly reducing black start costs.

With reference to the first aspect, in a first possible implementation, the battery pack further includes an isolated power supply circuit, and the auxiliary power supply is connected in parallel to the black start bus through the isolated power supply circuit. The isolated power supply circuit is configured to transfer the electric energy from the black start bus to the auxiliary power supply in an electrical isolation manner. A problem of difficult adaptation of a voltage of the black start bus due to battery pack expansion can be effectively avoided by using the electrical isolation manner between the black start bus and the battery cluster (pack).

With reference to the first possible implementation of the first aspect, in a second possible implementation, the isolated power supply circuit includes a first optocoupler, an input end of the first optocoupler is coupled to the black start bus, and the energy storage battery is connected to a start port of the auxiliary power supply through an output end of the first optocoupler. The first optocoupler is configured to transfer electric energy from the input end of the first optocoupler to the output end of the first optocoupler, to electrically connect the energy storage battery to the start port of the auxiliary power supply. Herein, a light emitting diode in the first optocoupler converts input electric energy into an optical signal and transfers the optical signal to a phototransistor, and the phototransistor converts the optical signal into electric energy for output. In this way, the electric energy can be transferred between the black start bus and the battery pack under a condition of electrical isolation, and interference caused when the black start bus is electrically connected to the battery pack is avoided.

With reference to the second possible implementation of the first aspect, in a third possible implementation, the output end of the first optocoupler and the black start control in the target battery pack are connected in parallel between the target energy storage battery and a start port of the target auxiliary power supply in the target battery pack. A target isolated power supply circuit in the target battery pack further includes an isolation winding. A power supply port of the target auxiliary power supply is connected to the black start bus through the isolation winding. The target auxiliary power supply is configured to: obtain power from the target energy storage battery; and supply power to the black start bus through the isolation winding. In the energy storage system, the black start control in the single target battery pack is triggered, so that the target battery pack obtains power from the energy storage battery in the battery pack and supplies power to the black start bus, and the black start bus supplies power to the auxiliary power supplies in the other battery packs (to electrically connect the auxiliary power supply to the energy storage battery in the other battery packs). In this way, problems such as poor start experience, high costs, and low reliability that are caused because the black start control needs to be installed in all battery packs in the battery cluster are avoided.

With reference to the third possible implementation of the first aspect, in a fourth possible implementation, the target isolated power supply circuit further includes a voltage adjustment unit, and a primary winding of the isolation winding is connected to the target auxiliary power supply through the voltage adjustment unit. The target controller in the target battery pack is configured to control the voltage adjustment unit to perform voltage conversion on an output voltage of the target auxiliary power supply, to output a target voltage to the black start bus through the isolation winding. Herein, the voltage adjustment unit performs voltage conversion on an output voltage of the power supply port of the auxiliary power supply, so that the isolation winding further performs voltage conversion on the voltage output by the voltage adjustment unit and performs corresponding on-off control. A secondary winding of the isolation winding outputs the target voltage to the black start bus. The black start bus may transfer a black start signal to the another battery pack in the battery cluster based on the auxiliary power supply and through isolated power supply of the isolation winding, to start the auxiliary power supply in the battery pack other than the target battery pack.

With reference to the fourth possible implementation of the first aspect, in a fifth possible implementation, the target isolated power supply circuit further includes a voltage adjustment unit and a second optocoupler, and a secondary winding of the isolation winding is connected to the black start bus through the voltage adjustment unit. An input end of the second optocoupler is connected to the target controller in the target battery pack, and an output end of the second optocoupler is connected to the voltage adjustment unit. The target controller in the target battery pack is configured to send a control instruction to the voltage adjustment unit through the second optocoupler, and the control instruction is used to control the voltage adjustment unit to perform voltage conversion on a voltage of the secondary winding of the isolation winding, to output a target voltage to the black start bus through the isolation winding. A light emitting diode in the second optocoupler converts input electric energy into an optical signal and transfers the optical signal to a phototransistor, and the phototransistor converts the optical signal into electric energy for output. In this way, the electric energy is transferred when the black start bus is not directly electrically connected to the battery pack, and interference caused when the black start bus is electrically connected to the battery pack is avoided, thereby implementing good electric energy transfer effect.

With reference to any one of the first aspect to the fifth possible implementation of the first aspect, in a sixth possible implementation, the energy storage system further includes an uninterruptible power supply (UPS), the UPS is coupled to the black start bus, and the UPS is configured to supply power to the black start bus, to trigger the black start bus to supply power to auxiliary power supplies in the plurality of battery packs. Herein, in a black start manner in which the UPS supplies power to the black start bus, a process of triggering the black start control (for example, pressing a button) is omitted. In addition, the UPS needs to supply power only for a process of electrically connecting the auxiliary power supply to the energy storage battery (this is equivalent to supplying power to the diode of the first optocoupler in each battery pack), where a power supply current of the UPS needs to be only several milliamperes. Therefore, even if there are hundreds of battery packs in the energy storage system, the UPS power is at a level of only dozens or hundreds of watts. This is far lower than a power required in a solution in which the UPS directly supplies power to a board in each battery pack. In this way, a power capacity of the UPS is reduced, and black start costs are significantly reduced.

With reference to any one of the first aspect to the sixth possible implementation of the first aspect, in a seventh possible implementation, each of the plurality of battery packs further includes a first switch transistor and a second switch transistor. The first switch transistor is connected in series to the energy storage battery in each battery pack, and the second switch transistor is connected in parallel to the energy storage battery in each battery pack. A controller in each battery pack is configured to control the first switch transistor in each battery pack to be turned on and the second switch transistor to be turned off, to connect the energy storage battery in each battery pack in series to a battery cluster bus. Herein, the energy storage system implements black start by using power supplied by the black start bus. This resolves a problem in which the energy storage system cannot be started from a cluster level because the battery cluster bus has no power, when the battery pack is equipped with a built-in battery optimizer (may include the first switch transistor and the second switch transistor). This has strong applicability.

According to a second aspect, this application provides a black start apparatus. The black start apparatus is used in an energy storage system. The energy storage system includes a battery cluster and a black start bus. The battery cluster includes a plurality of battery packs that are connected in series. The battery pack includes an energy storage battery, a controller, and an auxiliary power supply that is connected in parallel to the energy storage battery. The auxiliary power supply is coupled to the black start bus. The black start apparatus includes a black start control. The black start control is configured to: when being triggered, electrically connect a target energy storage battery to a target auxiliary power supply in a target battery pack in the plurality of battery packs. The target auxiliary power supply is configured to supply power to a target controller in the target battery pack and the black start bus based on electric energy provided by the target energy storage battery, to trigger the black start bus to supply power to auxiliary power supplies in battery packs in the plurality of battery packs other than the target battery pack. The black start apparatus is configured to: by using an auxiliary power supply in each battery pack in the other battery packs, electrically connect to each energy storage battery in each battery pack based on electric energy provided by the black start bus; and supply power to a controller in each battery pack based on electric energy provided by each energy storage battery.

In this application, by using the black start control carried in the target battery pack, the target battery pack in the plurality of battery packs electrically connects the target energy storage battery to the target auxiliary power supply in the target battery pack. In this way, the target auxiliary power supply supplies power to the target controller in the target battery pack and the black start bus based on the electric energy provided by the target energy storage battery, to trigger the black start bus to supply power to the auxiliary power supplies in the battery packs in the plurality of battery packs other than the target battery pack. The auxiliary power supply in each battery pack in the other battery packs is configured to: electrically connect to each energy storage battery in each battery pack based on electric energy provided by the black start bus; and supply power to a controller in each battery pack based on electric energy provided by each energy storage battery. In the energy storage system, the black start control in the single target battery pack is triggered, so that the target battery pack obtains power from the energy storage battery in the battery pack and supplies power to the black start bus, and the black start bus supplies power to the auxiliary power supplies in the other battery packs (to electrically connect the auxiliary power supply to the energy storage battery in the other battery packs). In this way, problems such as poor start experience, high costs, and low reliability that are caused because the black start control needs to be installed in all battery packs in the battery cluster are avoided. In addition, a UPS power required for performing black start by using the UPS is very low (the UPS needs to supply power only for a process of electrically connecting the auxiliary power supply to the energy storage battery), thereby reducing a UPS capacity when the UPS is equipped and significantly reducing black start costs.

With reference to the second aspect, in a first possible implementation, the black start apparatus further includes an isolated power supply circuit, and the auxiliary power supply is connected in parallel to the black start bus through the isolated power supply circuit. The isolated power supply circuit includes a first optocoupler. An input end of the first optocoupler is coupled to the black start bus. The energy storage battery is connected to a start port of the auxiliary power supply through an output end of the first optocoupler. The first optocoupler is configured to transfer electric energy from the input end of the first optocoupler to the output end of the first optocoupler, to electrically connect the energy storage battery to the start port of the auxiliary power supply. Herein, a light emitting diode in the first optocoupler converts input electric energy into an optical signal and transfers the optical signal to a phototransistor, and the phototransistor converts the optical signal into electric energy for output. In this way, the electric energy can be transferred between the black start bus and the battery pack under a condition of electrical isolation, and interference caused when the black start bus is electrically connected to the battery pack is avoided.

DESCRIPTION OF EMBODIMENTS

Figure 1:
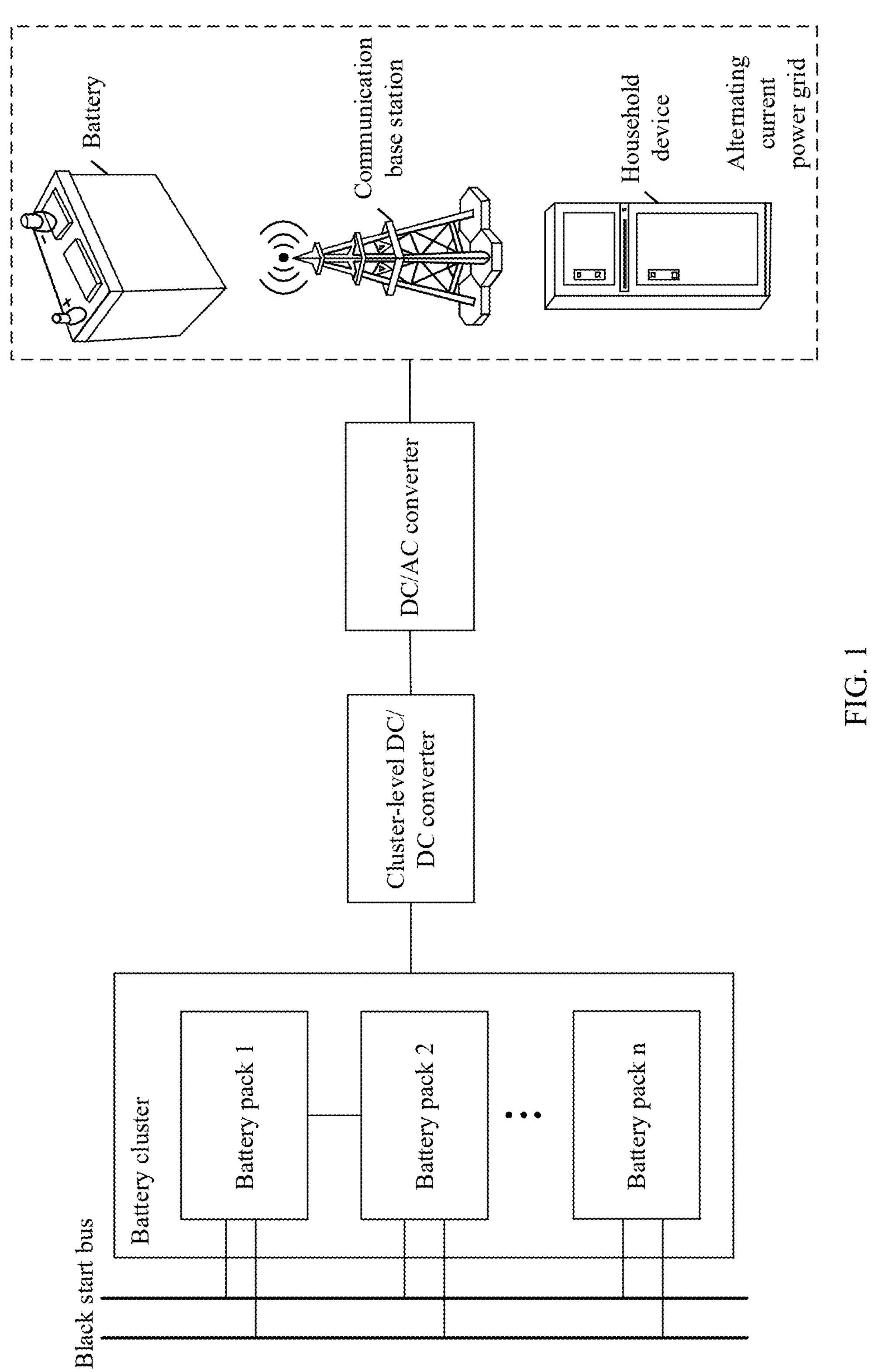
FIG. 1 is a diagram of an application scenario of an energy storage system according to this application.

FIG. 1 is a diagram of an application scenario of an energy storage system according to this application. The energy storage system provided in this application may include a battery cluster and a black start bus. The battery cluster may include a plurality of battery packs that are connected in series (for example, a battery pack 1, a battery pack 2, . . . , and a battery pack n that are connected in series). The plurality of battery packs that are connected in series are connected to a battery cluster bus. The battery cluster is coupled to a direct current end of a direct current DC/alternating current AC converter through a cluster-level direct current DC/DC converter, and an alternating current end of the DC/AC converter is coupled to an alternating current power grid. The cluster-level DC/DC converter may perform voltage conversion (which may be voltage step-up, voltage step-down, or the like) on a direct current (which may be a direct current output by each battery pack) output by the battery cluster in the energy storage system. The direct current DC/alternating current AC converter may perform inversion conversion on a direct current output by the cluster-level DC/DC converter, and output, to the alternating current power grid, an alternating current obtained through inversion conversion, to supply power to a power-consuming device such as a battery, a communication base station, or a household device on the alternating current power grid.

In some feasible implementations, the battery cluster shown in FIG. 1 may be directly coupled to the direct current end of the DC/AC converter, and the alternating current end of the DC/AC converter is coupled to the alternating current power grid. The DC/AC converter may perform inversion conversion on the direct current output by the battery cluster in the energy storage system, and output, to the alternating current power grid, an alternating current obtained through inversion conversion, to supply power to the power-consuming device such as the battery, the communication base station, or the household device on the alternating current power grid.

In some feasible implementations, when the energy storage system is disconnected from the power grid due to a fault, the energy storage system is in an off-grid mode. In this case, a black start manner may be used to restore a connection between the energy storage system and the power-consuming device in the power grid, and use the battery cluster in the energy storage system to supply power to the alternating current power grid. Currently, black start is implemented by supplying power by using an uninterruptible power supply (UPS) to support a control process of reconnecting the energy storage system to the alternating current power grid, or implemented by using power of the battery cluster in the energy storage system, when the energy storage system is disconnected from the power grid due to a fault. However, for a large-capacity and high-power energy storage system (for example, the battery cluster includes hundreds or thousands of battery packs), a black start solution in which the UPS is used to supply power requires a UPS device to provide a high supplying power. For example, the UPS supplies power to each board in the battery pack to connect each battery pack to the alternating current power grid. When power needs to be supplied to each board (including a fan in the battery pack), a supplying power in a black start process of the energy storage system is excessively high, and a power of the UPS needs to be high, causing high black start costs. In a manner of implementing black start by using the power of the battery cluster in the energy storage system, when the battery pack in the energy storage system is not continuously connected to a bus, a cluster-level battery bus in the energy storage system cannot supply power before the energy storage system is started. For example, the battery pack is equipped with a battery optimizer. A function of the battery optimizer is to, when voltage unbalance occurs on an energy storage battery in the battery pack, control connection and bypass of the energy storage battery by controlling a switch transistor in the battery pack, to implement balance of the battery pack. Power needs to be supplied to each switch transistor to turn on or turn off the switch transistor. Because the switch transistor in the battery pack is turned off by default, the cluster-level battery bus in the energy storage system cannot supply power before the energy storage system is started. In this case, when the battery optimizer is equipped, black start cannot be implemented by using the power of the battery cluster. This manner has low applicability.

In the energy storage system provided in this application, a battery pack in the energy storage system includes an energy storage battery and a switch transistor, and the battery pack further includes a controller and an auxiliary power supply that is connected in parallel to the energy storage battery. The auxiliary power supply is coupled to the black start bus. The plurality of battery packs include a target battery pack that carries a black start control (for ease of description, may be referred to as a target battery pack). By using the black start control carried in the target battery pack, the target battery pack electrically connects a target energy storage battery to a target auxiliary power supply in the target battery pack. In this way, the target auxiliary power supply supplies power to the black start bus based on electric energy provided by the target energy storage battery, to trigger the black start bus to supply power to auxiliary power supplies in battery packs in the plurality of battery packs other than the target battery pack. An auxiliary power supply in each battery pack in the other battery packs may electrically connect to the energy storage battery based on electric energy provided by the black start bus, and supply power to the controller based on electric energy provided by the energy storage battery. The controller may control the switch transistor in each battery pack to be turned on or turned off, to connect the energy storage battery in each battery pack in series to the battery cluster bus. The cluster-level DC/DC converter and the DC/AC converter may be started based on a direct current provided by the battery packs in the battery cluster to supply power to the alternating current power grid. The energy storage system uses the power supplied by the black start bus to implement black start. This resolves a problem in which the energy storage system cannot be started from a cluster level because the battery cluster bus has no power, when the battery pack is equipped with a built-in battery optimizer. In addition, problems such as poor start experience, high costs, and low reliability that are caused because a black start control needs to be installed in all battery packs in the battery cluster are avoided. In addition, when the UPS is equipped, a UPS power required for performing black start by using the UPS is very low (the UPS needs to supply power only for a process of electrically connecting the auxiliary power supply to the energy storage battery), thereby reducing a required power of the UPS and significantly reducing black start costs.

Figure 2:
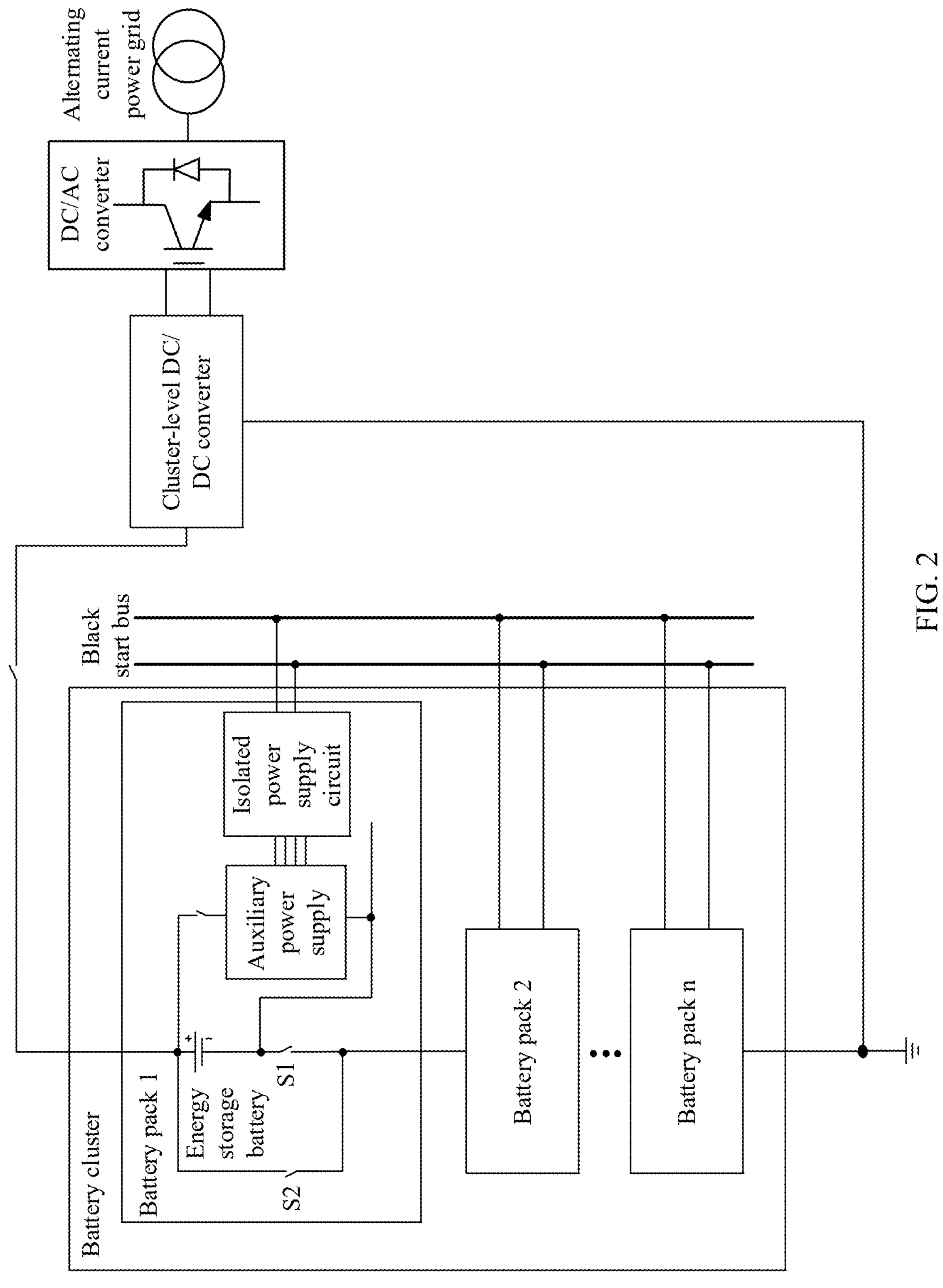
FIG. 2 is a diagram of a structure of an energy storage system according to this application.

FIG. 2 is a diagram of a structure of an energy storage system according to this application. The energy storage system shown in FIG. 2 includes a battery cluster and a black start bus. The battery cluster may include a plurality of battery packs that are connected in series (for example, a battery pack 1, a battery pack 2, . . . , and a battery pack n that are connected in series). The plurality of battery packs that are connected in series are connected to a battery cluster bus. The battery cluster is coupled to a direct current end of a direct current DC/alternating current AC converter through a cluster-level direct current DC/DC converter, and an alternating current end of the DC/AC converter is coupled to an alternating current power grid. The cluster-level DC/DC converter may perform voltage conversion (which may be voltage step-up, voltage step-down, or the like) on a direct current (which may be a direct current output by each battery pack) output by the battery cluster in the energy storage system. The direct current DC/alternating current AC converter may perform inversion conversion on a direct current output by the cluster-level DC/DC converter, and output, to the alternating current power grid, an alternating current obtained after the inversion conversion, to supply power to the alternating current power grid.

In some feasible implementations, the battery cluster shown in FIG. 2 may be directly coupled to the direct current end of the DC/AC converter, and the alternating current end of the DC/AC converter is coupled to the alternating current power grid. The DC/AC converter may perform inversion conversion on the direct current output by the battery cluster in the energy storage system, and output, to the alternating current power grid, an alternating current obtained after the inversion conversion, to supply power to a power-consuming device such as a battery, a communication base station, or a household device on the alternating current power grid.

In some feasible implementations, in the energy storage system shown in FIG. 2, each battery pack in the battery cluster may include an energy storage battery, a first switch transistor that is connected in series to the energy storage battery, and a second switch transistor that is connected in parallel to the energy storage battery. The battery pack 1 is used as an example. The battery pack 1 may include an energy storage battery, a first switch transistor (for ease of description, may be represented as a switch transistor S1), and a second switch transistor (for ease of description, may be represented as a switch transistor S2). The switch transistor S1 is connected in series to the energy storage battery, and the switch transistor S2 is connected in parallel to the energy storage battery. Herein, when the switch transistor S1 is turned on and the switch transistor S2 is turned off, the energy storage battery is connected in series to the battery cluster bus, to connect to the alternating current power grid (after being connected to the battery cluster bus, the energy storage battery may be coupled to the alternating current power grid through the cluster-level DC/DC converter and the DC/AC converter). When the switch transistor S1 is turned off and the switch transistor S2 is turned on, the energy storage battery bypasses the battery cluster bus. The battery pack 1 may further include a controller (not shown in FIG. 2), an auxiliary power supply that is connected in parallel to the energy storage battery, and an isolated power supply circuit. The auxiliary power supply is coupled to the black start bus through the isolated power supply circuit. The black start bus may supply power to the battery pack 1. Electric energy provided by the black start bus is transferred to the auxiliary power supply in the battery pack 1 in an electrical isolation manner by using the isolated power supply circuit. The auxiliary power supply may electrically connect to the energy storage battery based on the electric energy provided by the black start bus, to supply power to the controller in the battery pack 1 based on electric energy provided by the energy storage battery. The controller may control the switch transistor S1 to be turned on, to connect the energy storage battery in the battery pack 1 in series to the battery cluster bus. It may be understood that for composition of another battery pack and a process of connecting the another battery pack to the battery cluster bus, reference may be made to the description of the battery pack 1. Details are not described herein again. The cluster-level DC/DC converter and the DC/AC converter may be started based on the direct current provided by the battery pack in the battery cluster (a direct current provided by the energy storage battery in the battery pack) to supply power to the alternating current power grid. Herein, the energy storage system implements black start by using power supplied by the black start bus. This resolves a problem in which the energy storage system cannot be started from a cluster level because the battery cluster bus has no power, when the battery pack is equipped with a built-in battery optimizer (may include the first switch transistor and the second switch transistor). This has strong applicability. In addition, if the UPS supplies power in the process of electrically connecting the auxiliary power supply to the energy storage battery, a UPS power required for performing black start by using the UPS is very low, thereby reducing a UPS capacity when the UPS is equipped and significantly reducing black start costs.

Figure 3:
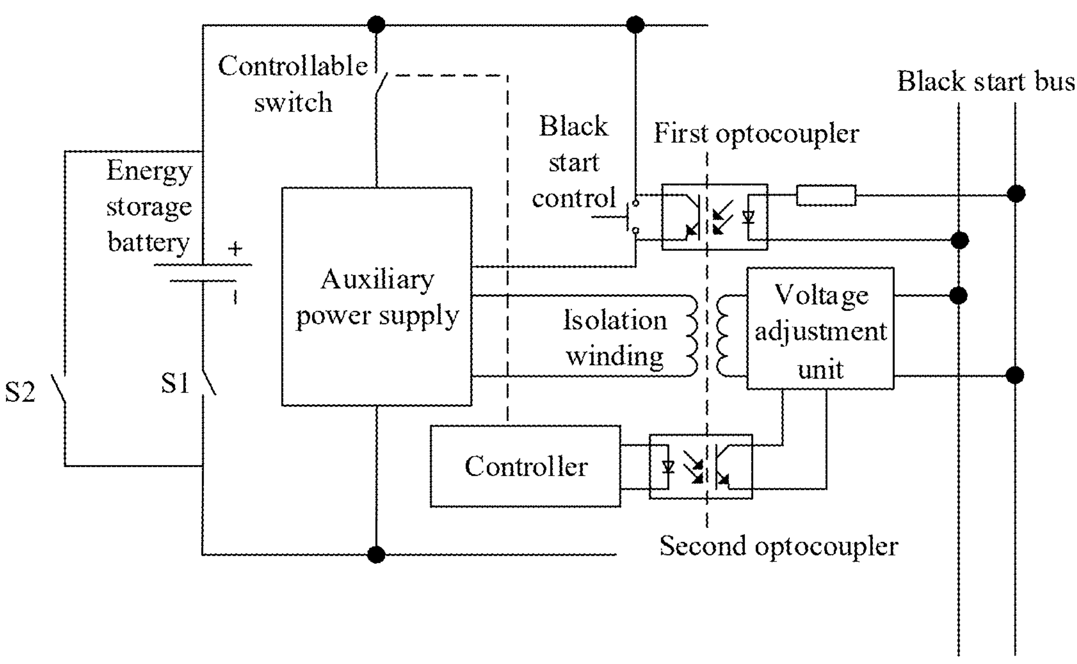
FIG. 3 is a diagram of a structure of a battery pack according to this application.

The following describes an energy storage system in embodiments of this application with reference to FIG. 2 to FIG. 5. In some feasible implementations, the electric energy provided by the black start bus may come from the battery pack in the battery cluster. Description is provided by using the following example: A target battery pack (which may be one or more of the plurality of battery packs that are connected in series, where description is provided in this application by using an example in which the target battery pack is one of the plurality of battery packs that are connected in series, and details are not described below again) in the battery cluster supplies power to the black start bus, and the black start bus is triggered to supply power to auxiliary power supplies in battery packs other than the target battery pack. With reference to FIG. 3, FIG. 3 is a diagram of a structure of a battery pack according to this application. As shown in FIG. 3, the battery pack shown in FIG. 3 may be the target battery pack in the plurality of battery packs that are connected in series in the battery cluster, and the battery pack may include a first optocoupler. An input end of the first optocoupler is coupled to the black start bus. The energy storage battery is connected to a start port of the auxiliary power supply through an output end of the first optocoupler. When the black start bus supplies power to the auxiliary power supply in the battery pack, the first optocoupler may transfer electric energy from the input end of the first optocoupler to the output end, to transfer the electric energy to the auxiliary power supply in an electrical isolation manner. In this way, the auxiliary power supply is electrically connected to the energy storage battery based on the electric energy provided by the black start bus. Optionally, the battery pack shown in FIG. 3 further includes a controllable switch. The auxiliary power supply may supply power to the controller based on electric energy provided by the energy storage battery. The controller may control the controllable switch to be turned on, to electrically connect the energy storage battery to the auxiliary power supply, so that the auxiliary power supply can still maintain the electrical connection to the energy storage battery when the black start bus no longer provides electric energy. A light emitting diode in the first optocoupler converts input electric energy into an optical signal and transfers the optical signal to a phototransistor, and the phototransistor converts the optical signal into electric energy for output. In this way, the electric energy is transferred when the black start bus is not directly electrically connected to the battery pack, and interference caused when the black start bus is electrically connected to the battery pack is avoided, thereby implementing good power supply effect.

In some feasible implementations, the target battery pack shown in FIG. 3 includes the switch transistor S1 that is connected in series to the energy storage battery and the switch transistor S2 that is connected in parallel to the energy storage battery. The switch transistor S1 and the switch transistor S2 are turned off by default. The controller may control the switch transistors to be turned on or off. The controller needs external power to implement control on each switch transistor. Further, the target battery pack shown in FIG. 3 may further include a black start control and an isolation winding. The black start control may be a button. The output end of the first optocoupler in the target battery pack and the black start control are connected in parallel between the energy storage battery (for ease of description, may be the target energy storage battery) and a start port of the auxiliary power supply (for ease of description, may be the target auxiliary power supply) in the target battery pack. A power supply port of the target auxiliary power supply is connected to the black start bus through the isolation winding. The black start control, when being triggered (for example, the button is pressed and held for a period of time), may electrically connect the target energy storage battery to the target auxiliary power supply. The target auxiliary power supply may supply power to a target controller in the target battery pack based on electric energy provided by the target energy storage battery, and supply power to the black start bus in an isolation manner by using the isolation winding. In this way, the black start bus is triggered to supply power to the auxiliary power supplies in the battery packs in the plurality of battery packs other than the target battery pack. Then, the auxiliary power supply in each battery pack is electrically connected to each energy storage battery in each battery pack based on electric energy provided by the black start bus (a first optocoupler in the other battery packs may transfer electric energy from an input end to an output end, to transfer the electric energy to the auxiliary power supply in an electrical isolation manner). For example, still with reference to FIG. 2, the battery pack 1 shown in FIG. 2 may be the target battery pack. That is, the battery pack 1 includes a black start control (which may be a button) and an isolation winding. After the button in the battery pack 1 is pressed and held for a period of time, the auxiliary power supply may be electrically connected to the energy storage battery in the battery pack, and the auxiliary power supply in the battery pack 1 may supply power to the black start bus in the isolation manner by using the isolation winding based on the electric energy provided by the energy storage battery. Herein, because power is essentially supplied for a process of electrically connecting the auxiliary power supply to the energy storage battery, instead of to the auxiliary power supply, a very low supplying power is needed for the black start bus, and is generally at a milliwatt level. The battery pack 2 to the battery pack n in the battery cluster are not configured with a black start control. Electric energy may be transferred to the battery pack 2 to the battery pack n by using the black start bus, so that an auxiliary power supply in each of the battery pack 2 to the battery pack n is electrically connected to an energy storage battery based on the electric energy provided by the black start bus (the first optocoupler in the other battery packs may transfer the electric energy from the input end to the output end, to transfer the electric energy to the auxiliary power supply in the electrical isolation manner). The auxiliary power supply in each battery pack may supply power to the controller based on the electric energy provided by the energy storage battery. The controller may control the first switch transistor (for example, the switch transistor S1 in the battery pack shown in FIG. 2 or FIG. 3) in each battery pack to be turned on, to connect the energy storage battery in series to the battery cluster bus. In the energy storage system, the black start control in the single target battery pack is triggered, so that the target battery pack obtains power from the energy storage battery in the battery pack and supplies power to the black start bus, and the black start bus supplies power to the auxiliary power supplies in the other battery packs (to electrically connect the auxiliary power supply to the energy storage battery in the other battery packs). In this way, problems such as poor start experience, high costs, and low reliability that are caused because the black start control needs to be installed in all battery packs in the battery cluster are avoided. In addition, the energy storage system implements black start by obtaining power from the energy storage battery by using the auxiliary power supply. This resolves a problem in which black start cannot be implemented based on power supplied by using a cluster-level, because the battery cluster bus has no power, when the battery pack is equipped with a built-in battery optimizer (may include the first switch transistor and the second switch transistor). This has strong applicability.

In some feasible implementations, the battery pack may further include a voltage adjustment unit and a second optocoupler. Still with reference to FIG. 3, the battery pack shown in FIG. 3 includes a first optocoupler and a second optocoupler. A secondary winding of the isolation winding in the battery pack may be connected to the black start bus through the voltage adjustment unit. An input end of the second optocoupler is connected to the controller, and an output end of the second optocoupler is connected to the voltage adjustment unit. The controller may send a control instruction to the voltage adjustment unit through the second optocoupler, to control the voltage adjustment unit to perform voltage conversion on a voltage of the secondary winding of the isolation winding and output a target voltage (which may be a safe voltage lower than 60 V, for example, 48 V, 36 V, 24 V, 15 V, or 12 V) to the black start bus. Herein, the voltage of the secondary winding of the isolation winding may be a direct current voltage obtained after the isolation winding performs voltage conversion on an output voltage (which may be an output voltage obtained based on power supply of the energy storage battery) of the power supply port of the auxiliary power supply. When black start ends, the controller may further send a control instruction to the voltage adjustment unit through the second optocoupler, to stop supplying power to the black start bus. This avoids continuous power supply and battery power consumption of the energy storage battery when black start is not needed. A light emitting diode in the second optocoupler converts input electric energy into an optical signal and transfers the optical signal to a phototransistor, and the phototransistor converts the optical signal into electric energy for output. In this way, the electric energy is transferred when the black start bus is not directly electrically connected to the battery pack, and interference caused when the black start bus is electrically connected to the battery pack is avoided, thereby implementing good electric energy transfer effect.

Figure 4:
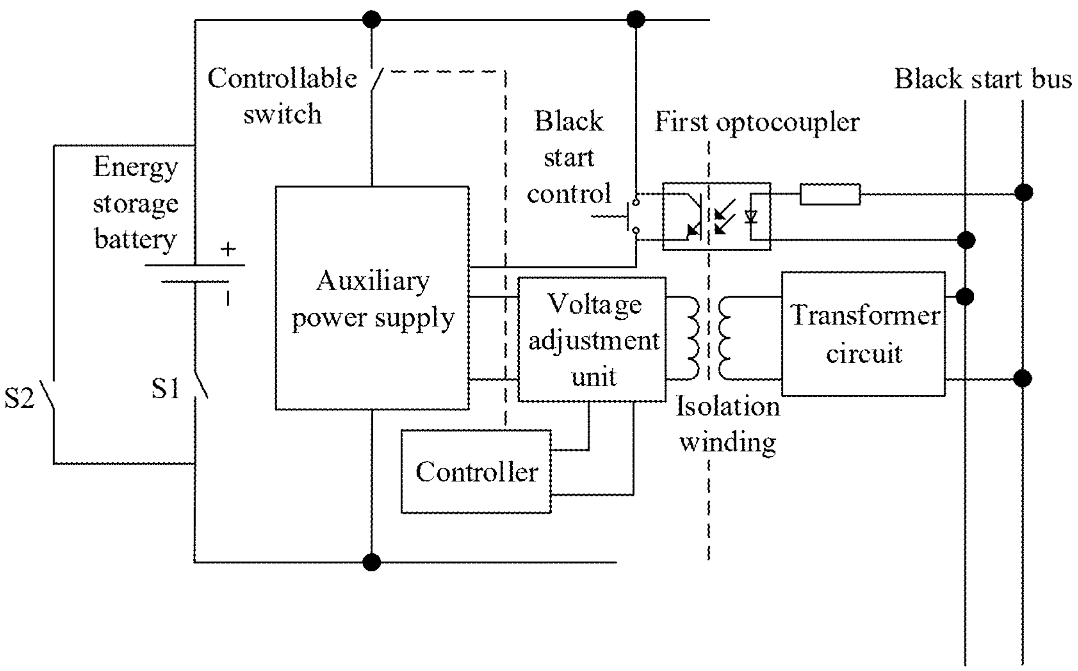
FIG. 4 is diagram of another structure of a battery pack according to this application.

In some feasible implementations, a primary winding of the isolation winding in the battery pack may be connected to the auxiliary power supply through the voltage adjustment unit. With reference to FIG. 4, FIG. 4 is a diagram of another structure of a battery pack according to this application. As shown in FIG. 4, the primary winding of the isolation winding in the battery pack may be connected to the auxiliary power supply through the voltage adjustment unit, and the controller in the battery pack is directly connected to the voltage adjustment unit. The controller may send a control instruction to the voltage adjustment unit, to control the voltage adjustment unit to perform voltage conversion on the output voltage of the power supply port of the auxiliary power supply. In this way, the isolation winding further performs voltage conversion on the voltage output by the voltage adjustment unit, and the secondary winding of the isolation winding outputs a target voltage (which may be a safe voltage lower than 60 V, for example, 48 V, 36 V, 24 V, 15 V, or 12 V) to the black start bus. The secondary winding of the isolation winding may be connected to the black start bus through a transformer circuit. The transformer circuit performs voltage conversion on an output voltage of the secondary winding of the isolation winding, to output the target voltage to the black start bus. When black start ends, the controller may further send a control instruction to the voltage adjustment unit, to stop supplying power to the black start bus. This avoids continuous power supply and battery power consumption of the energy storage battery when black start is not needed.

Figure 5:
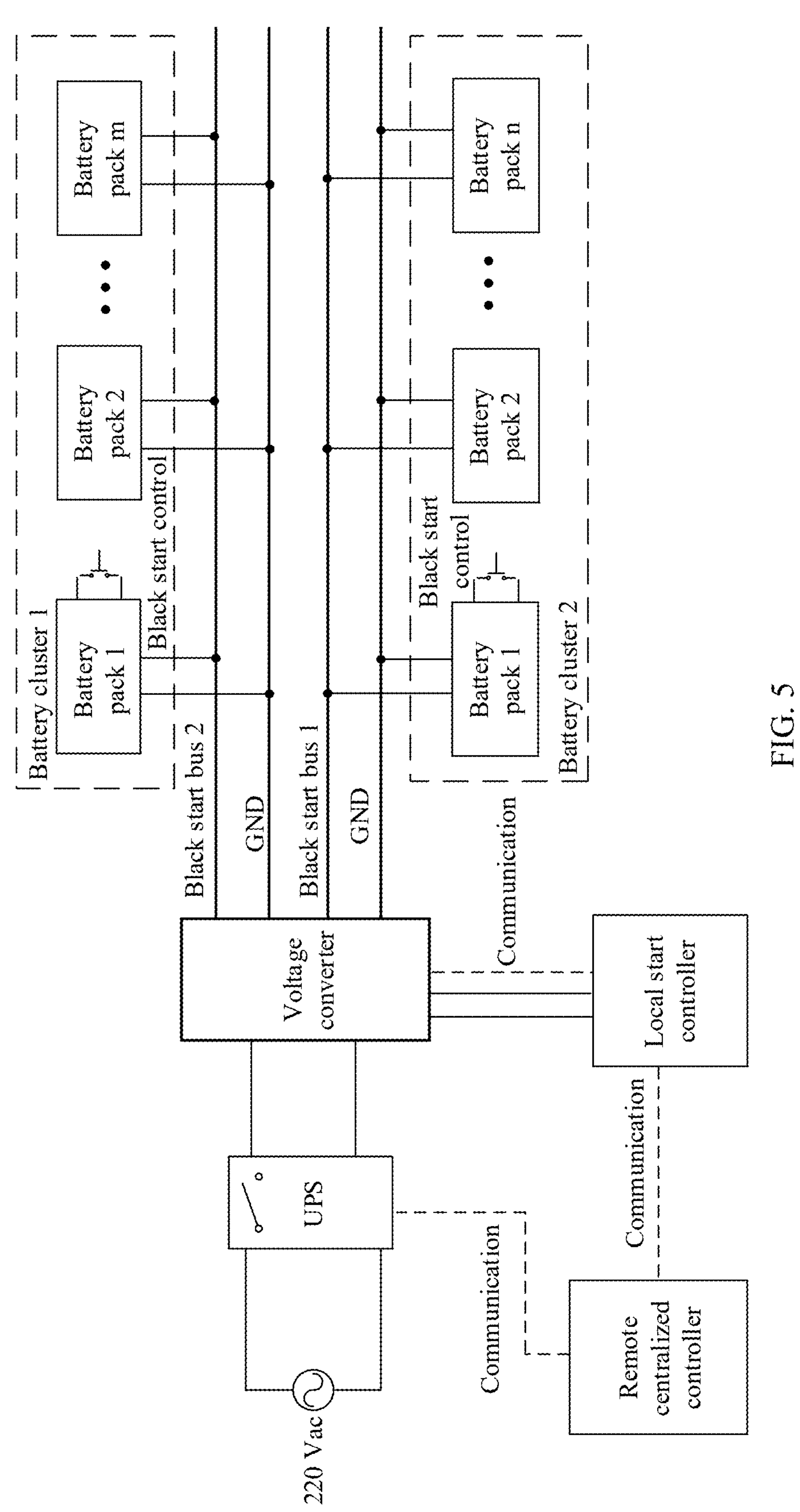
FIG. 5 is a diagram of another structure of an energy storage system according to this application.

In some feasible implementations, the energy storage system may further include an uninterruptible power supply (UPS). The UPS is coupled to the black start bus, and the UPS may supply power to the black start bus. In this way, the black start bus supplies power to the auxiliary power supplies in the plurality of battery packs that are connected in series, to electrically connect the auxiliary power supplies to the energy storage batteries (the first optocoupler in the battery pack may transfer electric energy from the input end to the output end, to transfer the electric energy to the auxiliary power supply in an electrical isolation manner). With reference to FIG. 5, FIG. 5 is a diagram of another structure of an energy storage system according to this application. As shown in FIG. 5, the energy storage system may include a black start bus 1 and a black start bus 2, and the black start bus 1 and the black start bus 2 are respectively connected to a battery cluster 1 and a battery cluster 2. The UPS in the energy storage system is coupled to the black start bus 1 and the black start bus 2 through a voltage converter. Herein, the voltage converter may be a voltage converter that can convert a direct current voltage (for example, when the UPS may provide a direct current voltage). Alternatively, the voltage converter may be a direct current voltage converter that can perform rectification and convert a direct current (for example, when the UPS may provide an alternating current voltage). The voltage converter may be determined based on a specific component type, and is not limited herein. In a black start process, the UPS may supply power to the voltage converter, and the voltage converter performs voltage conversion to output a target voltage to the black start bus 1 and the black start bus 2. In this way, the black start bus 1 supplies power to a battery pack 1 to a battery pack m that are connected in series in the battery cluster 1, and the black start bus 2 supplies power to a battery pack 1 to a battery pack n that are connected in series in the battery cluster 2. A first optocoupler in each battery pack may transfer electric energy from an input end to an output end, to transfer the electric energy to an auxiliary power supply included in the battery pack, thereby electrically connecting the auxiliary power supply to an energy storage battery. It may be understood that the UPS needs to supply power to the black start bus only for a process of electrically connecting the auxiliary power supply to the energy storage battery (this is equivalent to supplying power to a diode of the first optocoupler in each battery pack), and a power supply current of the UPS needs to be only several milliamperes. Therefore, even if there are hundreds of battery packs in the energy storage system, the UPS power is at a level of only dozens or hundreds of watts. This is far lower than a power required in a solution in which the UPS directly supplies power to a board in each battery pack, thereby reducing the power capacity of the UPS and significantly reducing black start costs.

In some feasible implementations, the energy storage system may further include a remote centralized controller and a local start controller. In the black start process, the remote centralized controller may communicate with the UPS, and control the UPS to supply power (the power supply may be alternating current power supply or direct current power supply) to the voltage converter. The remote centralized controller may send a black start instruction to the local start controller. In this way, the local start controller communicates with the voltage converter, and controls the voltage converter to output a target voltage to the black start buses (the black start bus 1 and the black start bus 2) coupled to the voltage converter. In this way, the black start bus 1 supplies power to the battery pack 1 to the battery pack m that are connected in series in the battery cluster 1, and the black start bus 2 supplies power to the battery pack 1 to the battery pack n that are connected in series in the battery cluster 2. The first optocoupler in each battery pack may transfer the electric energy from the input end to the output end, to transfer the electric energy to the auxiliary power supply included in the battery pack. After the auxiliary power supply in each battery pack is started, the auxiliary power supply supplies power to the controller in each battery pack. The controller may control the first switch transistor (for example, the switch transistor S1 in the battery pack shown in FIG. 2 or FIG. 3) in each battery pack to be turned on, to connect the energy storage battery in series to the battery cluster bus. Herein, in a black start manner in which the UPS supplies power to the black start bus, a process of triggering the black start control (for example, pressing the button) is omitted. In addition, the UPS needs to supply power only for a process of electrically connecting the auxiliary power supply to the energy storage battery (this is equivalent to supplying power to the diode of the first optocoupler in each battery pack), where a power supply current of the UPS needs to be only several milliamperes. Therefore, even if there are hundreds of battery packs in the energy storage system, the UPS power is at a level of only dozens or hundreds of watts. This is far lower than a power required in a solution in which the UPS directly supplies power to a board in each battery pack. In this way, a power capacity of the UPS is reduced, and black start costs are significantly reduced.

In this application, by using the black start control carried in the target battery pack, the target battery pack in the plurality of battery packs electrically connects the target energy storage battery to the target auxiliary power supply in the target battery pack. In this way, the target auxiliary power supply supplies power to the target controller in the target battery pack and the black start bus based on the electric energy provided by the target energy storage battery, to trigger the black start bus to supply power to the auxiliary power supplies in the battery packs in the plurality of battery packs other than the target battery pack. The auxiliary power supply in each battery pack in the other battery packs is configured to: electrically connect to each energy storage battery in each battery pack based on electric energy provided by the black start bus; and supply power to a controller in each battery pack based on electric energy provided by each energy storage battery. In the energy storage system, the black start control in the single target battery pack is triggered, so that the target battery pack obtains power from the energy storage battery in the battery pack and supplies power to the black start bus, and the black start bus supplies power to the auxiliary power supplies in the other battery packs (to electrically connect the auxiliary power supply to the energy storage battery in the other battery packs). In this way, problems such as poor start experience, high costs, and low reliability that are caused because the black start control needs to be installed in all battery packs in the battery cluster are avoided. In addition, the energy storage system may alternatively supply power to the black start bus by using the UPS. In this way, the black start bus supplies power to the auxiliary power supplies in the plurality of battery packs that are connected in series, so that the auxiliary power supply in each battery pack is electrically connected to each energy storage battery in each battery pack based on the electric energy provided by the black start bus (the first optocoupler in the battery pack may transfer electric energy from the input end to the output end, to transfer the electric energy to the auxiliary power supply in an electrical isolation manner). The UPS needs to supply power to the black start bus only for the process of electrically connecting the auxiliary power supply to the energy storage battery (this is equivalent to supplying power to the diode of the first optocoupler in each battery pack), and the power supply current of the UPS needs to be only several milliamperes. Therefore, even if there are hundreds of battery packs in the energy storage system, the UPS power is at a level of only dozens or hundreds of watts. This is far lower than the power required in a solution in which the UPS directly supplies power to the board in each battery pack, thereby reducing the power capacity of the UPS and significantly reducing black start costs.

What is claimed is:

1. An energy storage system, comprising:
a battery cluster; and
a black start bus;
wherein the battery cluster is coupled to an alternating current power grid, the battery cluster comprises a plurality of battery packs that are connected in series;
wherein each battery pack of the plurality of battery packs comprises an energy storage battery, a controller, and an auxiliary power supply that is connected in parallel to the energy storage battery, and wherein the auxiliary power supply is coupled to the black start bus;
wherein the plurality of battery packs comprise a target battery pack associated with a black start control, the black start control is disposed between a target energy storage battery and a target auxiliary power supply in the target battery pack, and wherein the black start control is configured to, upon being triggered, electrically connect the target energy storage battery to the target auxiliary power supply, so that the target auxiliary power supply is configured to supply power to a target controller in the target battery pack and the black start bus based on electric energy provided by the target energy storage battery, to trigger the black start bus to supply power to auxiliary power supplies in other battery packs in the plurality of battery packs other than the target battery pack; and
wherein an auxiliary power supply in each battery pack in the other battery packs is configured to: electrically connect to each energy storage battery in each battery pack in the other battery packs based on electric energy provided by the black start bus; and supply power to a controller in each battery pack in the other battery packs based on electric energy provided by each energy storage battery in the other battery packs.

2. The energy storage system according to claim 1,
wherein each battery pack of the plurality of battery packs further comprises an isolated power supply circuit, and the auxiliary power supply of each battery pack is connected in parallel to the black start bus through the isolated power supply circuit; and
wherein the isolated power supply circuit is configured to transfer the electric energy from the black start bus to the auxiliary power supply in an electrical isolation manner.

3. The energy storage system according to claim 2,
wherein the isolated power supply circuit comprises a first optocoupler, an input end of the first optocoupler is coupled to the black start bus, and the energy storage battery is connected to a start port of the auxiliary power supply through an output end of the first optocoupler; and
wherein the first optocoupler is configured to transfer electric energy from the input end of the first optocoupler to the output end of the first optocoupler, to electrically connect the energy storage battery to the start port of the auxiliary power supply.

4. The energy storage system according to claim 3,
wherein the output end of the first optocoupler and the black start control in the target battery pack are connected in parallel between the target energy storage battery and a start port of the target auxiliary power supply in the target battery pack, a target isolated power supply circuit in the target battery pack comprises an isolation winding, and a power supply port of the target auxiliary power supply is connected to the black start bus through the isolation winding; and
wherein the target auxiliary power supply is configured to: obtain power from the target energy storage battery; and supply power to the black start bus through the isolation winding.

5. The energy storage system according to claim 4,
wherein the target isolated power supply circuit further comprises a voltage adjustment unit, and a primary winding of the isolation winding is connected to the target auxiliary power supply through the voltage adjustment unit; and
wherein the target controller in the target battery pack is configured to control the voltage adjustment unit to perform voltage conversion on an output voltage of the target auxiliary power supply, to output a target voltage to the black start bus through the isolation winding.

6. The energy storage system according to claim 4,
wherein the target isolated power supply circuit further comprises a voltage adjustment unit and a second optocoupler, and a secondary winding of the isolation winding is connected to the black start bus through the voltage adjustment unit; and an input end of the second optocoupler is connected to the target controller in the target battery pack, and an output end of the second optocoupler is connected to the voltage adjustment unit; and
wherein the target controller in the target battery pack is configured to send a control instruction to the voltage adjustment unit through the second optocoupler, and the control instruction is used to control the voltage adjustment unit to perform voltage conversion on a voltage of the secondary winding of the isolation winding, to output a target voltage to the black start bus through the isolation winding.

7. The energy storage system according to claim 1, wherein the energy storage system further comprises an uninterruptible power supply (UPS), the UPS is coupled to the black start bus, and the UPS is configured to supply power to the black start bus, to trigger the black start bus to supply power to auxiliary power supplies in the plurality of battery packs.

8. The energy storage system according to claim 2, wherein the energy storage system further comprises an uninterruptible power supply (UPS), the UPS is coupled to the black start bus, and the UPS is configured to supply power to the black start bus, to trigger the black start bus to supply power to auxiliary power supplies in the plurality of battery packs.

9. The energy storage system according to claim 3, wherein the energy storage system further comprises an uninterruptible power supply (UPS), the UPS is coupled to the black start bus, and the UPS is configured to supply power to the black start bus, to trigger the black start bus to supply power to auxiliary power supplies in the plurality of battery packs.

10. The energy storage system according to claim 4, wherein the energy storage system further comprises an uninterruptible power supply (UPS), the UPS is coupled to the black start bus, and the UPS is configured to supply power to the black start bus, to trigger the black start bus to supply power to auxiliary power supplies in the plurality of battery packs.

11. The energy storage system according to claim 5, wherein the energy storage system further comprises an uninterruptible power supply (UPS), the UPS is coupled to the black start bus, and the UPS is configured to supply power to the black start bus, to trigger the black start bus to supply power to auxiliary power supplies in the plurality of battery packs.

12. The energy storage system according to claim 1, wherein each battery pack of the plurality of battery packs further comprises a first switch transistor and a second switch transistor, the first switch transistor is connected in series to the energy storage battery in each battery pack, the second switch transistor is connected in parallel to the energy storage battery in each battery pack, and a controller in each battery pack is configured to control the first switch transistor in each battery pack to be turned on and the second switch transistor to be turned off, to connect the energy storage battery in each battery pack in series to a battery cluster bus.

13. The energy storage system according to claim 2, wherein each battery pack of the plurality of battery packs further comprises a first switch transistor and a second switch transistor, the first switch transistor is connected in series to the energy storage battery in each battery pack, the second switch transistor is connected in parallel to the energy storage battery in each battery pack, and a controller in each battery pack is configured to control the first switch transistor in each battery pack to be turned on and the second switch transistor to be turned off, to connect the energy storage battery in each battery pack in series to a battery cluster bus.

14. The energy storage system according to claim 3, wherein each battery pack of the plurality of battery packs further comprises a first switch transistor and a second switch transistor, the first switch transistor is connected in series to the energy storage battery in each battery pack, the second switch transistor is connected in parallel to the energy storage battery in each battery pack, and a controller in each battery pack is configured to control the first switch transistor in each battery pack to be turned on and the second switch transistor to be turned off, to connect the energy storage battery in each battery pack in series to a battery cluster bus.

15. The energy storage system according to claim 4, wherein each battery pack of the plurality of battery packs further comprises a first switch transistor and a second switch transistor, the first switch transistor is connected in series to the energy storage battery in each battery pack, the second switch transistor is connected in parallel to the energy storage battery in each battery pack, and a controller in each battery pack is configured to control the first switch transistor in each battery pack to be turned on and the second switch transistor to be turned off, to connect the energy storage battery in each battery pack in series to a battery cluster bus.

16. The energy storage system according to claim 5, wherein each battery pack of the plurality of battery packs further comprises a first switch transistor and a second switch transistor, the first switch transistor is connected in series to the energy storage battery in each battery pack, the second switch transistor is connected in parallel to the energy storage battery in each battery pack, and a controller in each battery pack is configured to control the first switch transistor in each battery pack to be turned on and the second switch transistor to be turned off, to connect the energy storage battery in each battery pack in series to a battery cluster bus.

17. The energy storage system according to claim 6, wherein each battery pack of the plurality of battery packs further comprises a first switch transistor and a second switch transistor, the first switch transistor is connected in series to the energy storage battery in each battery pack, the second switch transistor is connected in parallel to the energy storage battery in each battery pack, and a controller in each battery pack is configured to control the first switch transistor in each battery pack to be turned on and the second switch transistor to be turned off, to connect the energy storage battery in each battery pack in series to a battery cluster bus.

18. The energy storage system according to claim 7, wherein each battery pack of the plurality of battery packs further comprises a first switch transistor and a second switch transistor, the first switch transistor is connected in series to the energy storage battery in each battery pack, the second switch transistor is connected in parallel to the energy storage battery in each battery pack, and a controller in each battery pack is configured to control the first switch transistor in each battery pack to be turned on and the second switch transistor to be turned off, to connect the energy storage battery in each battery pack in series to a battery cluster bus.

19. A black start apparatus, wherein the black start apparatus is used in an energy storage system, the energy storage system comprises a battery cluster and a black start bus, the battery cluster comprises a plurality of battery packs that are connected in series, each battery pack of the plurality of battery packs comprises an energy storage battery, a controller, and an auxiliary power supply that is connected in parallel to the energy storage battery, and the auxiliary power supply is coupled to the black start bus;

wherein the black start apparatus comprises a black start control, the black start control is configured to, upon being triggered, electrically connect a target energy storage battery to a target auxiliary power supply in a target battery pack in the plurality of battery packs, so that the target auxiliary power supply is configured to supply power to a target controller in the target battery pack and the black start bus based on electric energy provided by the target energy storage battery, to trigger the black start bus to supply power to auxiliary power supplies in other battery packs in the plurality of battery packs other than the target battery pack; and wherein the black start apparatus is configured to: by using an auxiliary power supply in each battery pack in the other battery packs, electrically connect to each energy storage battery in each battery pack in the other battery packs based on electric energy provided by the black start bus; and supply power to a controller in each battery pack in the other battery packs based on electric energy provided by each energy storage battery in the other battery packs.

20. The black start apparatus according to claim 19, wherein the black start apparatus further comprises an isolated power supply circuit, and the auxiliary power supply is connected in parallel to the black start bus through the isolated power supply circuit; and wherein the isolated power supply circuit comprises a first optocoupler, an input end of the first optocoupler is coupled to the black start bus, the energy storage battery is connected to a start port of the auxiliary power supply through an output end of the first optocoupler, and the first optocoupler is configured to transfer electric energy from the input end of the first optocoupler to the output end of the first optocoupler, to electrically connect the energy storage battery to the start port of the auxiliary power supply.

* * * * *